C. A. HOWARD.
FIELD AND GARDEN HOE.
No. 183,930. Patented Oct. 31, 1876.
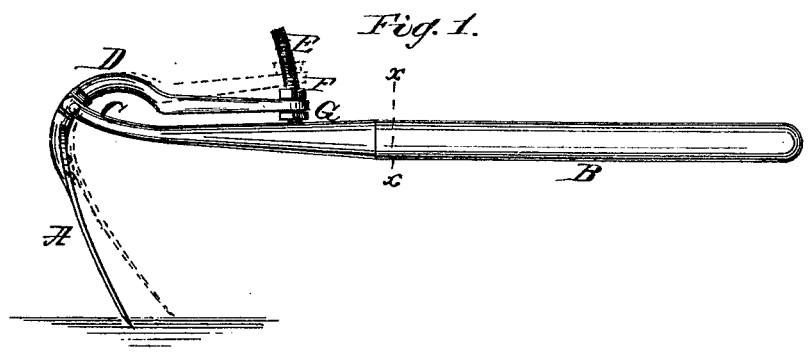
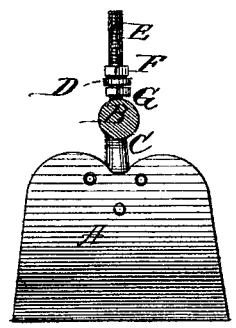
Witnesses
Inventor
Charles A. Howard

UNITED STATES PATENT OFFICE.

CHARLES A. HOWARD, OF ELMIRA, NEW YORK, ASSIGNOR TO NATHAN P. EATON, OF SAME PLACE.

IMPROVEMENT IN FIELD AND GARDEN HOES.

Specification forming part of Letters Patent No. 183,930, dated October 31, 1876; application filed July 29, 1876.

*To all whom it may concern:*

Be it known that I, CHARLES A. HOWARD, of the city of Elmira, State of New York, have invented a new and Improved Field and Garden Hoe; and I do declare that the following is a full and exact description thereof, reference being had to the accompanying drawings, and to the letters of reference marked thereon.

Figure 1 is a side view of my improved hoe. Fig. 2 is a front view of the same, or a section upon the line $x\ x$, Fig. 1.

My invention consists of an adjustable hoe-handle, which may be set at different angles to the hoe, in order to adapt the hoe to different kinds of work, or to the height of a man or boy, as may be desired.

In the accompanying drawings, Fig. 1 is a side view of the hoe and handle, the adjustment of the hoe being shown in dotted lines.

The hoe is made in the usual manner, and then provided with a long shank, D, to which the handle B is pivoted at C, Fig. 1; and a screw-bolt or segmental stud, E, is attached strongly to the handle or iron socket thereof. This bolt passes through a hole in the end of the shank D, and is securely held by means of the nuts F and G.

I do not limit myself to the precise construction above described, as a common slot and thumb-screw, or other suitable means, may be employed for adjusting the handle.

Having fully described my invention, I claim—

The segmental stud E, or its substantial equivalent, in combination with the handle B and the shank or tang D, the handle and tang being pivoted together, as shown at C, as and for the purpose specified.

CHARLES A. HOWARD.

Witnesses:
 N. P. FASSETT,
 H. B. SMITH.